United States Patent [19]

Pettit

[11] Patent Number: 4,616,871
[45] Date of Patent: Oct. 14, 1986

[54] SNAP-IN WINDOW BOOT FOR TRUCK-CAMPER COMBINATIONS AND THE LIKE

[76] Inventor: Thomas L. Pettit, 21420 118th Ave. East, Graham, Wash. 98338

[21] Appl. No.: 757,258

[22] Filed: Jul. 22, 1985

[51] Int. Cl.⁴ ............................................. B60P 3/32
[52] U.S. Cl. .................................... 296/166; 160/374; 160/105
[58] Field of Search ............ 296/166; 52/208; 277/237 R; 160/91, 372, 374, 105, DIG. 2

[56] References Cited

U.S. PATENT DOCUMENTS

| | | | |
|---|---|---|---|
| 2,600,192 | 6/1952 | Bell | 160/372 |
| 3,837,700 | 9/1974 | Van Slyke | 296/166 |
| 3,900,224 | 8/1975 | Copeland | 296/166 |
| 4,279,426 | 7/1981 | Flack, Jr. | 296/166 |
| 4,299,422 | 11/1981 | Pettit | 296/166 |

Primary Examiner—Robert R. Song
Attorney, Agent, or Firm—Quaintance, Murphy & Presta

[57] ABSTRACT

A plastics material boot for insertion within adjacent, aligned openings or windows in a camper, cap or canopy and truck combination. A central, flexible tunnel in the form of an inflatable toroidal chamber has spring loaded, compressible, generally quadrilaterally shaped ends inserted through and behind the openings in a compressed state where after they are released to expand and retain the ends behind the openings. The central tunnel is then inflated. No other attachment of any kind is needed to install and retain the boot in place.

8 Claims, 6 Drawing Figures

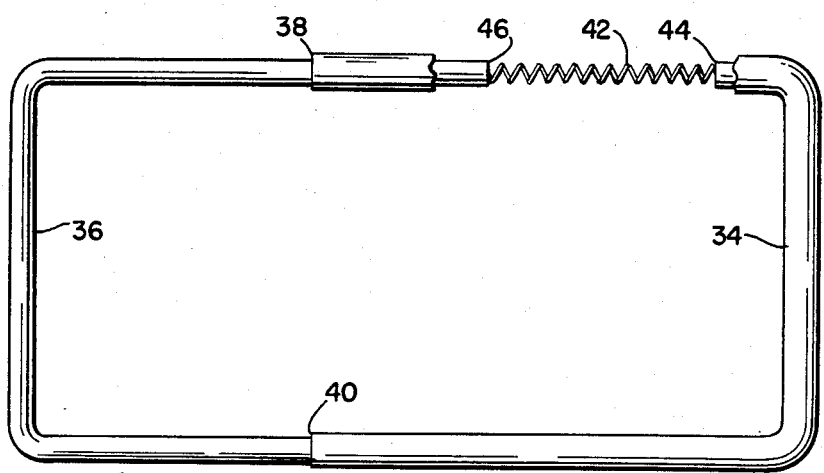
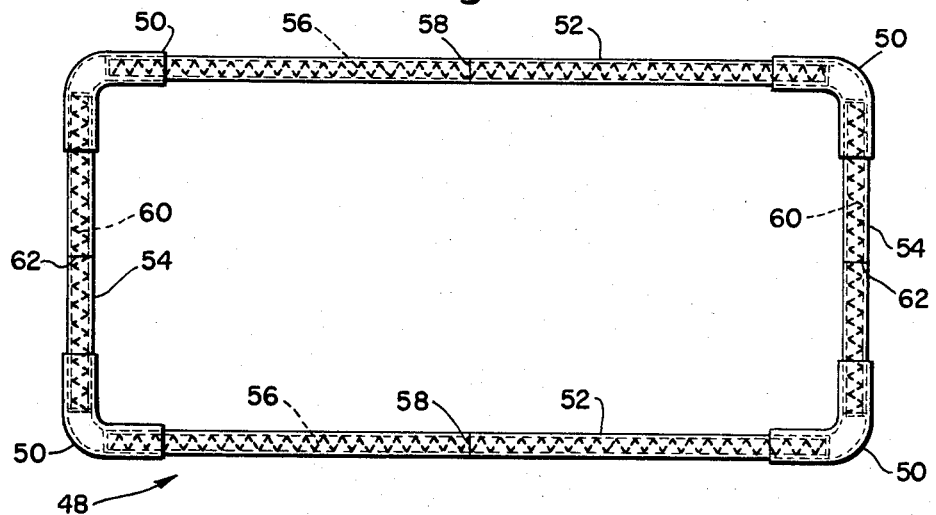
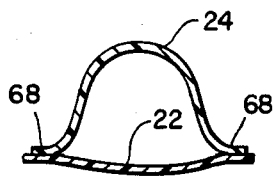
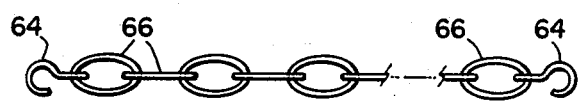

SNAP-IN WINDOW BOOT FOR TRUCK-CAMPER COMBINATIONS AND THE LIKE

BACKGROUND OF THE INVENTION

This invention relates generally to seals for passageway structures for interconnecting truck and camper, cap or canopy combinations and more particularly to an improved, easily installed, easily removed inflatable boot structure.

Trucks carrying campers, caps or the like commonly include a rear window on the cab of the truck which is in approximate registry or alignment with a window on a forward wall of the camper, cap, etc. It is quite desirable to interconnect or couple these windows with a seal or tunnel assembly which is sealed within the window openings of the cab and camper so that weather, dirt and debris cannot enter the camper or truck cab. At the same time, communication is provided through this ready access opening. Furthermore, it is most desirable to have such a seal or window boot assembly which may be easily installed and removed without any permanent attachment to the truck or camper and it is further desirable to have such an assembly which may be installed and removed without need of any tools.

In the past, window boots of the type under constuction were permanently or semi-permanently installed in window openings of the camper or cab or both window openings. Further, there is at least one disclosure of inflatable couplings or seals between cars which far predates the development of cab and camper combinations. For example, U.S. Pat. No. 506,421 issued Oct. 10, 1893 to M. Dickerson shows a connection between adjacent railroad passenger cars including one or more tubes filled with air or other gas under pressure and arranged peripherally about the doorway opening at the end of the car. The design reduces shock between the cars when the train is moving.

As for more recent developments, U.S. Pat. No. 3,321,234 issued to W. L. Harrell et al on May 23, 1967 discloses a combined window closure panel and interconnecting boot structure. The window closure and panel completely replaces the rear window of the truck cab and a rigid rectangular tunnel interconnects the cab panel and window with the front window in the camper. U.S. Pat. No. 3,625,560 issued to R. M. Bjork on Dec. 7, 1971 illustrates boot with a flexible tunnel, the tunnel having one end permanently stapled or attached about the interior periphery of the camper window, the semi-rigid tunnel extending into the frame of the truck cab window opening. There is no need to alter the window opening of the truck cab. A dual chambered inflatable seal placed between a truck cab and the front wall of the camper about the windows of each is disclosed in U.S. Pat. No. 3,837,700 issued Sept. 24, 1974 to G. C. Van Slyke. A rim or pins may project from the camper or the cab in order to retain the seal in place. A pair of U.S. Patents issued to R. M. Bjork et al, namely U.S. Pat. Nos. 3,844,603 issued Oct. 29, 1974 and 3,853,346 issued Dec. 10, 1974 are similar to the Bjork '560 patent discussed above but include a frame fitted in the frame of the truck cab window to receive the forward end of the tunnel; the rear of the device is permanently attached, to the camper front window, however. U.S. Pat. No. 3,897,970 issued Aug. 5, 1975 to H. H. Gattenby shows an inflatable U-shaped seal wedged about the top and sides of the mating window openings of a camper-truck cab combination.

A boot with a flexible tunnel having rigid frame members at each end of the tunnel, the frame members being installed behind the window openings of the camper and truck combination are shown in U.S. Pat. No. 3,900,224 issued Aug. 19, 1975 to A. B. Copeland. No other alteration of any other window opening is needed; however, the device is in two parts and is rather difficult to install. U.S. Pat. No. 4,093,301 issued June 6, 1978 to S. W. T. Kwok shows a flexible quilted boot filled with insulative material which is moldable over the perimeter of the openings between mating adjacent doorway openings of a truck cab and camper combination. The camper has a forward overhang portion over the roof of the cab.

More recent developments are as follows. An inflatable doughnut which is placed about the mating openings of a truck cab and camper combination is disclosed in U.S. Pat. No. 4,172,494 issued Oct. 30, 1979 to C. C. Saulters. U.S. Pat. No. 4,279,426 issued July 21, 1981 to E. Flack, Jr. shows a camper-truck combination boot having an elongated tunnel with ends extended through the aligned windows of the combination, each boot end having a spiral, endless resilient member which is snap-fit behind the respective windows of the camper-truck combination. Finally, U.S. Pat. No. 4,299,422 issued Nov. 10, 1981 to J. E. Pettit discloses a boot with a flexible central tunnel and inflatable tubular chambers at each end of the tunnel which are snap-fit behind the respective aligned window openings of a camper-truck combination.

While the various devices just discussed above are useful and have been found acceptable, there remains a need for a simple window boot having sufficient stiffness at each of its installed ends whereby the boot is sure to be retained in place in the truck-camper combination yet can be installed or removed with a minimum or inconvenience and without need of any tools.

SUMMARY OF THE INVENTION

Accordingly, it is a principal object of the invention to provide a snap-in boot for interconnecting the window openings of a truck cab and camper, cap or canopy combination, the boot including a flexible tunnel and ends in the form of U-shaped semi-rigid, interconnected spring loaded members which are placed behind the windows of the truck-camper combination, the boot being easily installed, not permanantly connected to the truck-camper combination and yet sufficiently structurally sound to stay in place.

It is another object of the invention to provide a flexible boot structure for interconnecting window openings of a truck-camper combination, the boot having a central, toroidal, inflatable member which provides an additonal seal about the window openings.

It is a further object of the invention to provide a boot for interconnecting window openings of a truck and camper combination, the boot being of uncomplicated structure and thus low in cost of manufacture. Yet another object of the invention is to provide a boot for interconnecting the window openings of a truck-camper combination, the boot having a central, toroidal, inflatable seal, the chamber portion of the inflatable seal being manufactured so as bulge outwardly around the window openings to perform a sealing function, rather than inwardly into the space between the respective, aligned windows.

It is still a further object of the invention to provide a boot structure for insertion into the windows of a truck-camper combination, the ends of the boot having U-shaped legs which are spring urged apart into a retention position, there further being a clip assembly to retain the legs compressed together for ease of insertion of the boot into the windows of a truck-camper combination.

BRIEF DESCRIPTION OF THE DRAWINGS

Other and more complete objects and advantages of this invention will become readily apparent by reference to the following detailed specification and drawings in which:

FIG. 3 is a plan view of the resilient end leg structure of one embodiment of the invention with parts broken away to show interior detail;

FIG. 4 is a plan view similar to FIG. 3 but showing another embodiment of the invention;

FIG. 5 is a detail section view showing the inflatable central chamber of the invention in cross section; and FIG. 6 is a partial plan view of a clip structure which may be used to compress the structures as shown in either FIG. 3 or FIG. 4 as the invention is being installed or removed from the truck-camper combination.

DESCRIPTION OF THE PREFERRED EMBODIMENTS

Figure 1:
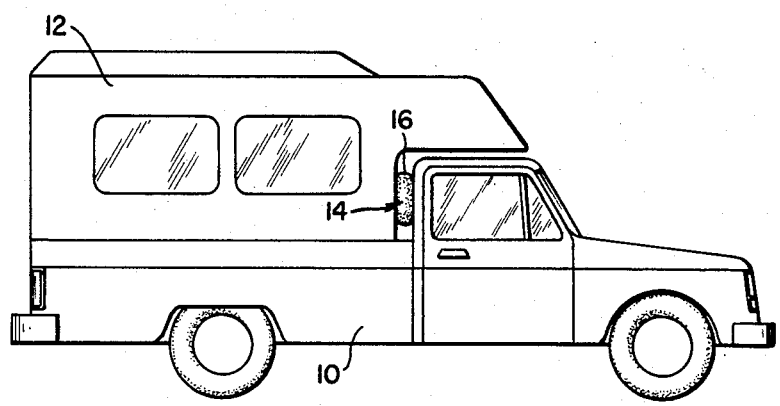
FIG. 1 is a side, elevation view of a truck and camper combination with the boot of this invention installed in place.

Referring now to the drawings by reference character, FIG. 1 illustrates one possible truck and camper combination including a truck 10 upon which is mounted a camper 12. The window boot of this invention is identified at 14 and is shown installed in place between aligned window openings of the truck and camper combination. In this figure, the central, inflatable chamber is shown at 16.

Figure 2:
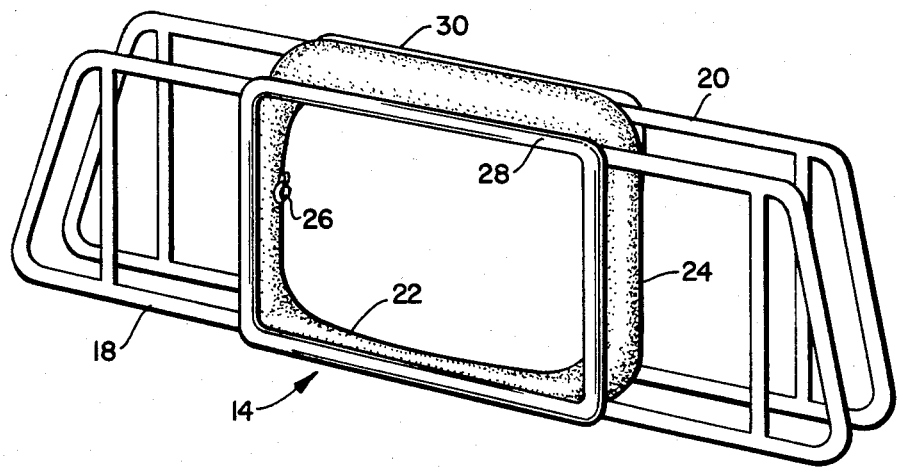
FIG. 2 is a perspective, somewhat diagrammatic view showing the invention installed between the front window of a camper and the rear window of a truck cab.

The somewhat diagrammatic view of FIG. 2 illustrates the window boot 14 in place between the aligned window openings 18 and 20 of a truck cab rear wall and a camper front wall respectively. The windows 18 and 20 as shown usually include sliding glass panes received in tracks. In any event, these windows 18,20 are entirely conventional and do not form any part of the present invention.

As shown in FIG. 2, the invention includes a central tunnel 22 having a surrounding, inflatable toroidal chamber 24 which may be inflatable in any suitable manner, such as through an otherwise conventional oral inflator 26. At each end of the tunnel 22 are a pair of boot retention structures 28,30. Only one or both of the retention structures, 28,30 may be compressed laterally for installation or removal, as shown in FIG. 3 or in both directions, as shown in FIG. 4. It is not necessary for both structures 28,30 to be compressed because, during installation, one, such as structure 28, may be placed behind one window and the other may be compressed and tilted slightly for installation behind the other window, such as 20, whereupon the structure may be released and it will then expand into a retention position.

FIGS. 3 and 4 illustrate specific embodiments of the compressible leg assemblies of the retention structures 28,30. These leg assemblies are encased within the material forming tunnel 22, which has ends of sufficient length that are wrapped about the leg assemblies and then sealed or stitched back upon the material forming tunnel 22. In a preferred embodiment, tunnel 22 and the chamber 24 are made of a plastics material such as vinyl.

Referring now to FIG. 3, one embodiment 32 of a compressible leg assembly is illustrated. The leg assembly is made of a pair of U-shaped members 34,36, both being of plastic in the preferred embodiment, the member 34 having open ends 38,40 into which the ends of the member 36 are inserted in telescoping fashion, the external diameter of the member 36 being slightly less than the internal diameter of the member 34. As shown in the upper righthand portion of FIG. 3, a spring 42 is inserted within leg of member 34 and seats against a plug 44 therein. A crimp in the member 34 or any other suitable means can be used to entrap spring 42 in place. The other end of coil spring 42 abuts against the free end 46 of one of the legs of the member 36. The lower horizontal leg illustrated in FIG. 3 is constructed internally in precisely the same fashion as the upper, horizontal leg. Thus, a pair of compressible legs are provided and the assembly may be compressed together for insertion through a truck or camper window, simply by squeezing together the vertical legs of the members 34 and 36.

Another embodiment of a compressible leg assembly is illustrated at 48 in FIG. 4. This quadrilateral or rectangular leg assembly includes four, tubular corner members 50, two elongate horizontal tubular sections 52 and two shorter vertical leg members 54. The members 54,54 are telescopically, slidably received in the corners 50 as are the horizontal tubular portions 52,52. The legs 54 and 52 have an external diameter which is slightly less than the internal diameter of the corner-pieces 50. The legs 52,52 have an elongate, coil spring 56 entrapped therein as by a crimp 58 about the center of the leg 52. Similarly, each vertical leg 54 has an elongate spring 60 entrapped therein as by a crimp 62. Thus, when installing or removing an end structure 28 or 30 employing the leg assembly 48 of FIG. 4, all that is needed is to compress the leg assembly 48 slightly laterally and vertically in order to fit the same through a window opening. Only a slight compression is necessary because the dimensions of the end structures 28,30 only need be slightly larger than the window opening with which they are associated in order to be retained in place.

If desired, the installation or removal process may be made easier by the provision of a clip structure to retain the legs of the leg assembly 32 or 48 in a compressed state during installation or removal. Such a clip structure is shown in FIG. 6 and includes end hooks 64 interconnected by a flexible chain 66. Of course, such a chain will have a length substantially less than the distance between the vertical portions of the leg assembly 32 or the vertical legs 54 of the leg assembly 48 shown in FIG. 4. Regarding FIG. 4, another chain assembly with hooks such as shown in FIG. 6 may be used to compress the horizontal legs 52,52 together; this chain should have a length substantially less than the distance between the horizontal legs 52,52.

Referring now to FIG. 5, a cross section of chamber 24 and tunnel 22 is illustrated in slightly exaggerated fashion. A strip of material is used to form the chamber 24, the strip having a predetermined width, the long edges of which are brought slightly together and then seamed or stitched to tunnel 22, at 68. The effect is such that, upon inflation of chamber 24 as by oral inflation means 26 (FIG. 2), the chamber 24 bulges outwardly to form an even more effective seal about the facing windows 18,20 of the truck-camper combination. Also, the tunnel 22 tends not to bulge inwardly into the interior space of the boot, thus, not reducing the passageway formed by the window boot any more than necessary. In a typical embodiment, the strip of material forming chamber 24 will be five inches wide but will have its long edges sealed or stitched to the material forming tunnel 22 a distance only 4 inches apart or less.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A sealing means or boot for use between adjacent window or passageway openings in the cab of a vehicle and a component mounted on th vehicle such as a camper, cap or canopy, said boot comprising: a tunnel made of relatively flexible material having an external circumference approximately equal the internal circumference of the passageway openings in which the boot is installed, said tunnel having a length somewhat greater than the spacing between the vehicle cab and component passageway openings, said tunnel terminating in opposed ends; and retention means, at each of said opposed ends of said tunnel for retaining said opposed ends behind the passageway openings, outside of the space between the passageway openings, each said retention means being substantially quadrilateral in configuration and having a circumference greater than that of the passageway opening behind which it is placed, at least one of said retention means including a first pair of opposed legs joined by a pair of opposed, inwardly compressible legs, each said compressible leg having slidably interfitted members spring urged to an expanded state, said slidably interfitted members being constructed and arranged to permit substantial relative movement of one of said first pair of opposed legs towards the other of said first pair of opposed legs, whereby said one retention means may be installed behind a passageway opening by grasping said first pair of legs and squeezing the same together, inserting said one retention means through a passageway opening, and releasing said one retention means whereupon said compressible legs expand and said one retention means assumes a circumference greater than that of the passageway opening through which it was inserted.

2. A sealing means or boot for use between adjacent window or passageway openings in the cab of a vehicle and a component mounted on the vehicle such as a camper, cap or canopy, said boot comprising: a tunnel made of relatively flexible material having an external circumference approximately equal the internal circumference of the passageway openings in which the boot is installed, said tunnel having a length somewhat greater than the spacing between the vbhicle cab and component passageway openings, said tunnel terminating in opposed ends; retention means, at each of said opposed ends of said tunnel for retaining said opposed ends behind the passageway openings outside of the space between the passageway openings, each said retention means being substantially quadrilateral in configuration and having a circumference greater than that of the passageway opening behind which it is placed, at least one of said retention means including a first pair of opposed legs joined by a pair of opposed, inwardly compressible legs which are spring urged to an expanded state, whereby said one retention means may be installed behind a passageway opening by grasping said first pair of legs and squeezing the same together, inserting said one retention means through a passageway opening, and releasing said one retention means whereupon said compressible legs expand and said one retention means assumes a circumference greater than that of the passageway opening through which it was inserted; and said tunnel further comprising a central, inflatable toroidal chamber arranged essentially parallel to said tunnel opposed ends and means for inflating said chamber, thus to form an additional seal located in the space between the vehicle and component adjacent passageway openings, said chamber being formed by an endless band of material having opposed edges, a predetermined width and a circumference approximating the circumference of said tunnel, said tunnel being of one-piece construction between said opposed ends, said opposed edges of said band being secured to said tunnel in an air-tight relationship, thus to form said chamber.

3. The boot as claimed in claim 2, wherein the circumference of said band is approximately the same as the circumference of the exterior of said tunnel, said band opposed edges being secured to said tunnel exterior a distance apart which is less than said band predetermined width, whereupon inflation of said chamber, a sealed chamber is formed which bulges outwardly from said tunnel exterior.

4. The boot as claimed in claim 2, further comprising inflation means for said inflatable chamber.

5. The boot as claimed in claim 3, further comprising inflation means for said inflatable chamber.

6. The boot as claimed in claim 1 wherein both of said retention means include pairs of said compressible legs.

7. The boot as claimed in claim 1 wherein said one retention means comprise a first substantially U-shaped tubular member having open, terminal ends and a second substantially U-shaped tubular member having reduced diameter ends inserted within said first tubular member open terminal ends, said open and reduced diameter ends forming said opposed, inwardly compressible legs, there further being coil springs means inserted within said first tubular member open terminal ends and retained therein, said reduced diameter ends abutting thereagainst.

8. A sealing means or boot for use between adjacent window or passageway openings in the cab of a vehicle and a component mounted on the vehicle such as a camper, cap or canopy, said boot comprising: a tunnel made of relatively flexible material having an external circumference approximately equal the internal circumference of the passageway openings in which the boot is installed, said tunnel having a length somewhat greater than the spacing between the vehicle cab and component passageway openings, said tunnel terminating in opposed ends; retention means, at each of said opposed ends of said tunnel for retaining said opposed ends behind the passageway openings outside of the space between the passageway openings, each of said retention means being substantially quadrilateral in configuration and having a circumference greater than that of the passageway opening behind which it is placed, at least one of said retention means including a first pair of opposed legs joined by a pair of opposed, inwardly compressible legs spring urged to an expanded state whereby said one retention means may be installed behind a passageway opening by grasping said first pair of legs and squeezing the same together, inserting said one retention means through a passageway opening, and releasing said one retention means whereupon said compressible legs expand and said one retention means assumes a circumference greater than that of the passageway opening through which it was inserted; and compression retaining clip means for facilitating placement of said one retention means behind a passageway opening, including a pair of clips joined by a central segment having a length substantially less than the distance between said first pair of opposed legs whereby said clips may be attached to said first pair of opposed legs thus to reduce the length of said pair of compressible legs and retain the same in a compressed state during installation of said one retention means as aforesaid.

* * * * *